Oct. 12, 1948.  L. T. McGEE  2,451,294
POWER OPERATED SCRAPER
Filed Aug. 8, 1944  5 Sheets-Sheet 1
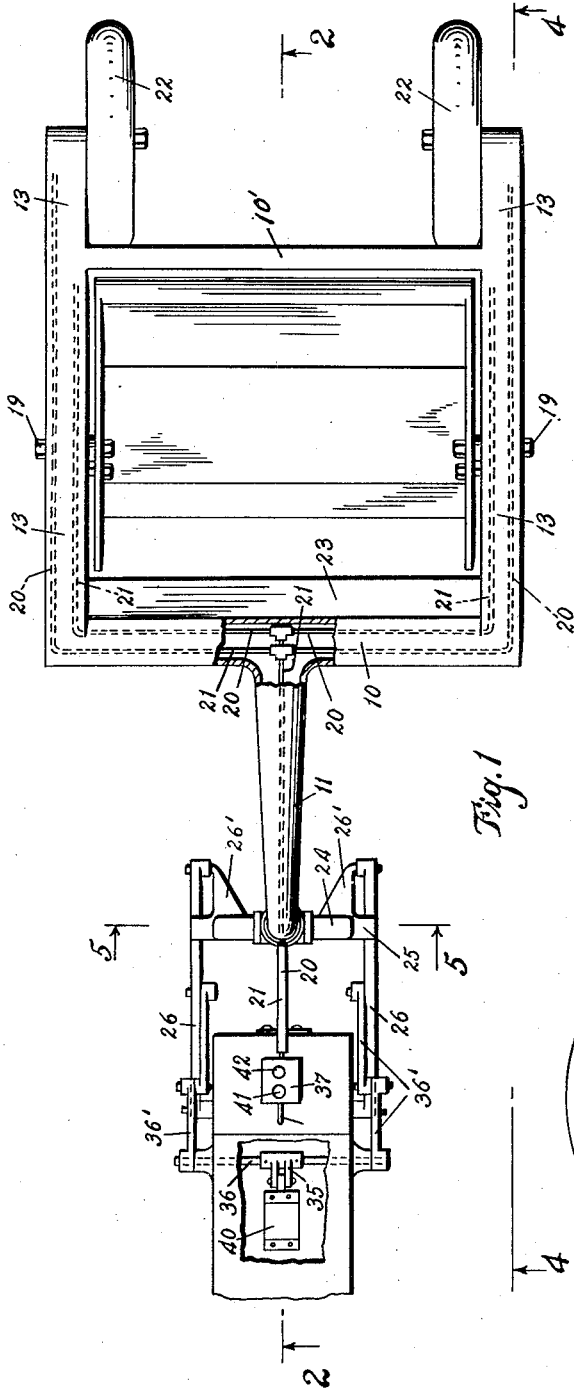
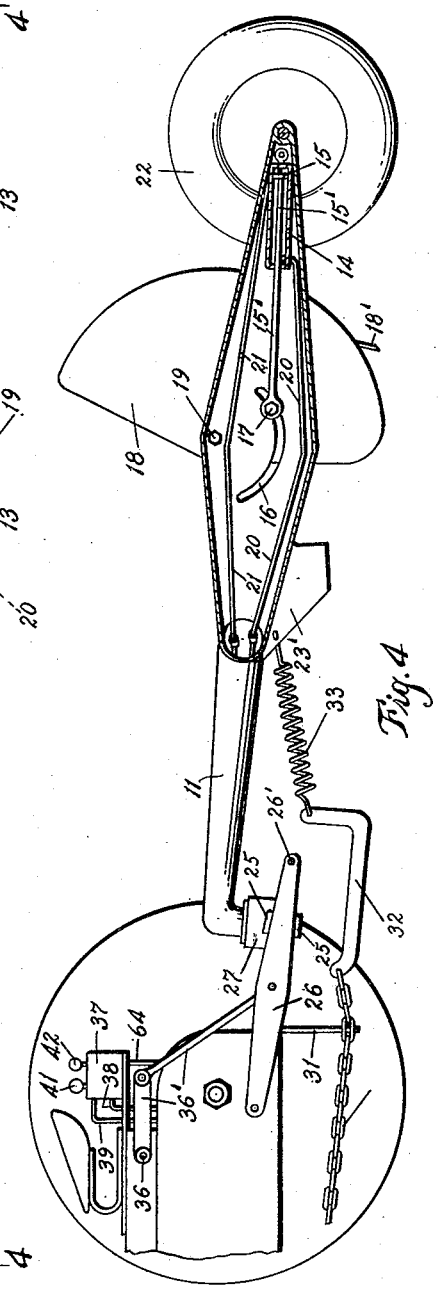
INVENTOR
Leland T. McGee
[signature]
ATTORNEY.

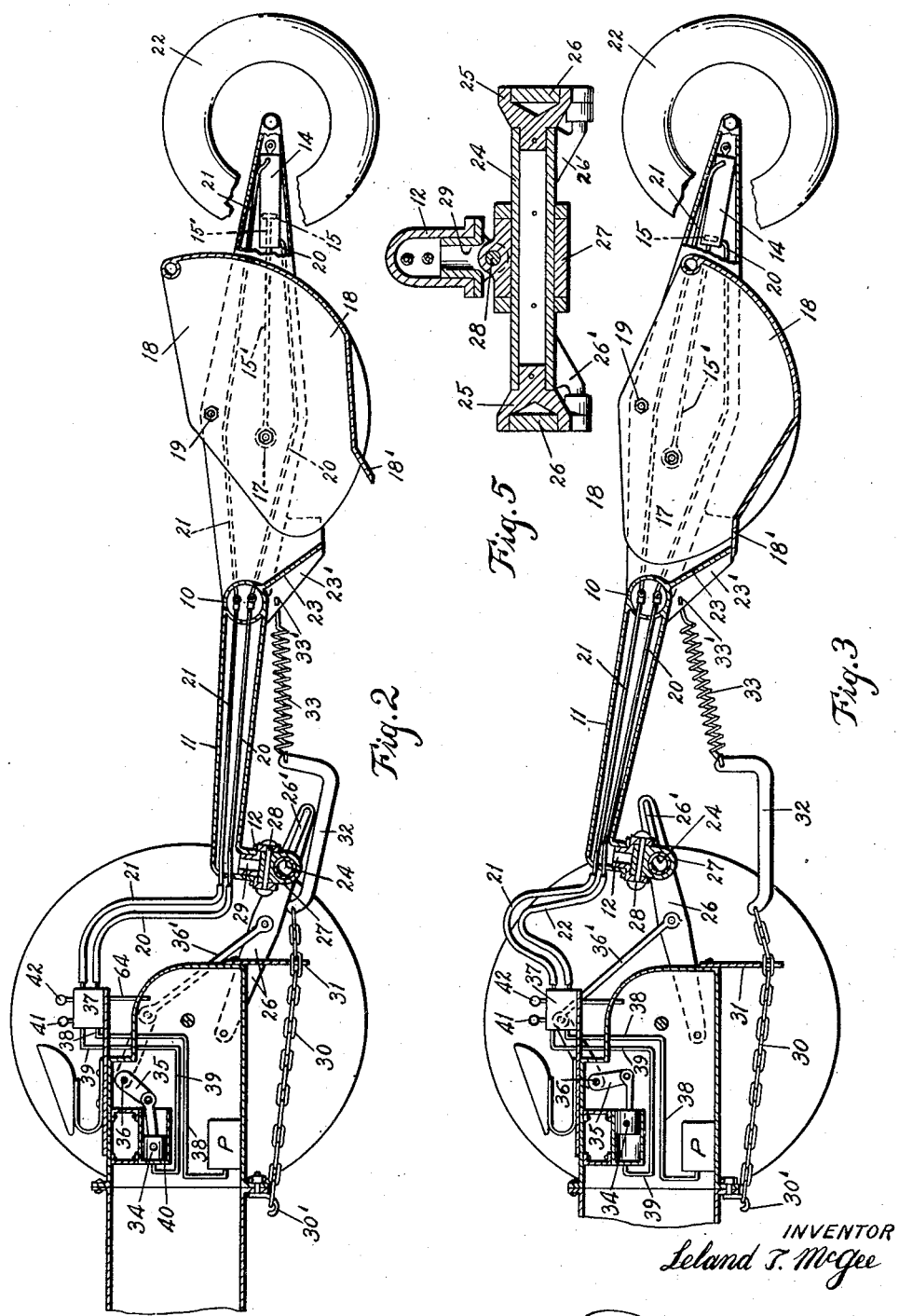

Oct. 12, 1948.  L. T. McGEE  2,451,294
POWER OPERATED SCRAPER
Filed Aug. 8, 1944  5 Sheets-Sheet 3

INVENTOR
Leland T. McGee

ATTORNEY.

Oct. 12, 1948. L. T. McGEE 2,451,294
POWER OPERATED SCRAPER
Filed Aug. 8, 1944 5 Sheets—Sheet 4
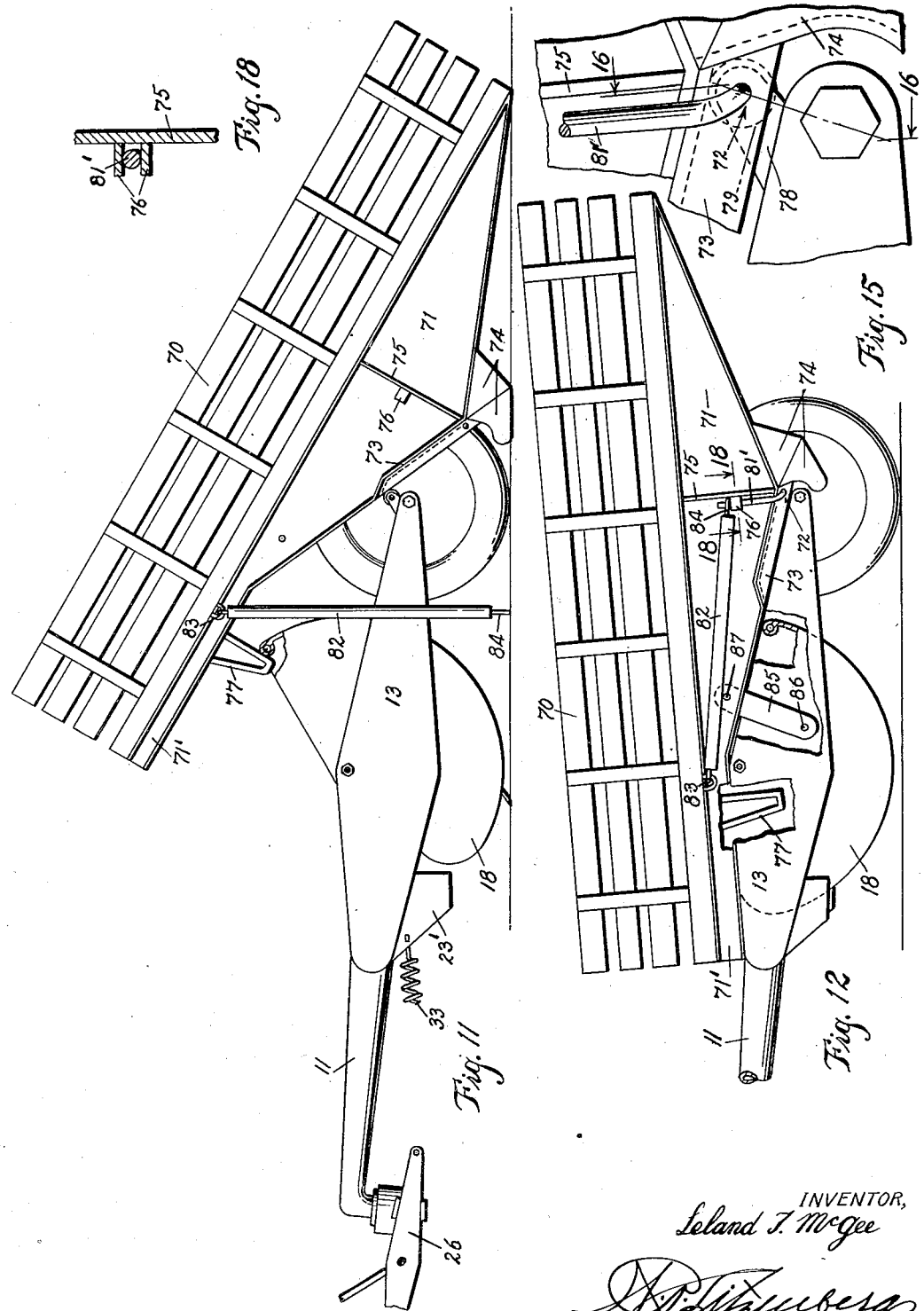
INVENTOR,
Leland T. McGee
ATTORNEY Oct. 12, 1948. L. T. McGEE 2,451,294
POWER OPERATED SCRAPER
Filed Aug. 8, 1944 5 Sheets-Sheet 5
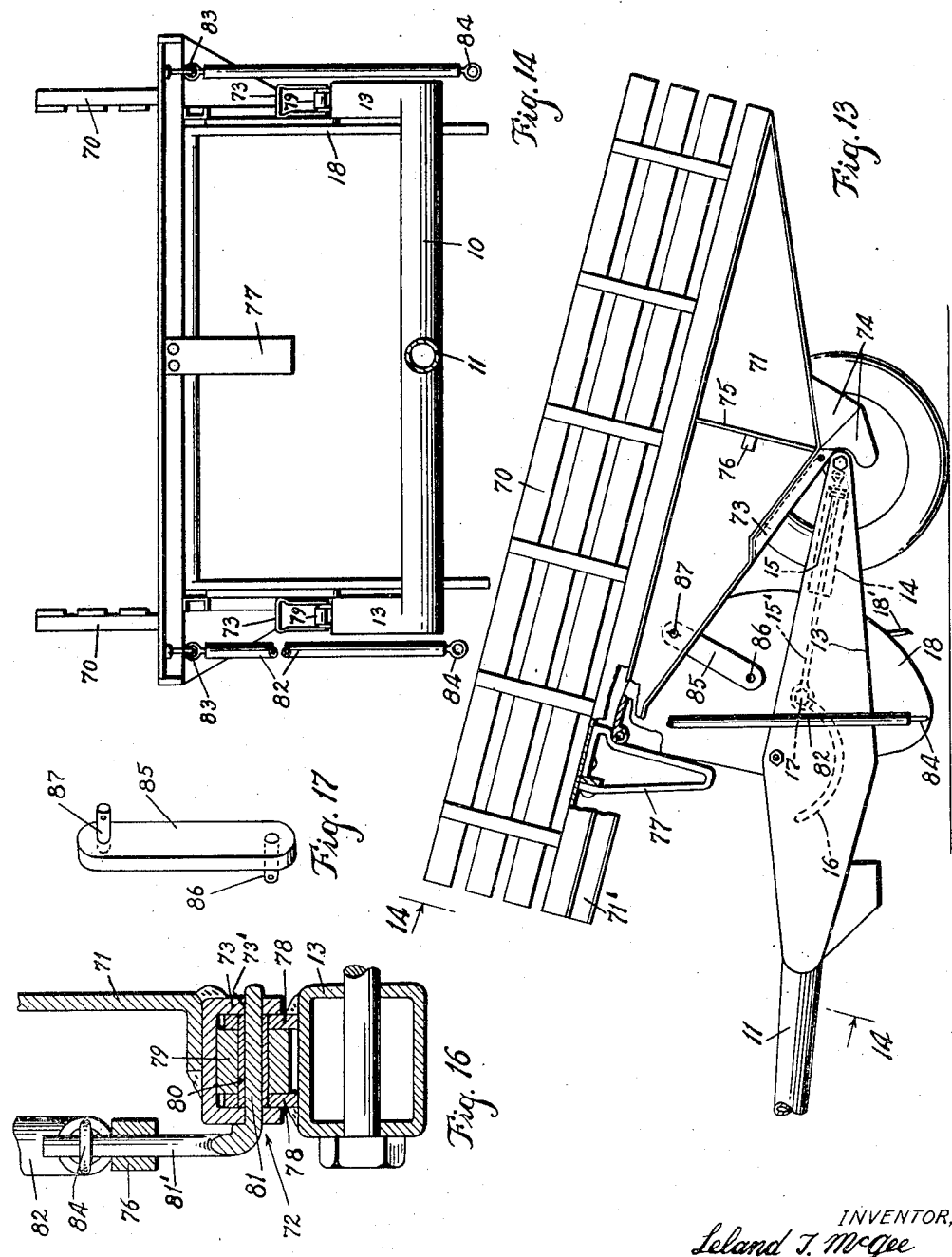
INVENTOR,
Leland T. McGee
ATTORNEY.

Patented Oct. 12, 1948

2,451,294

UNITED STATES PATENT OFFICE 2,451,294

POWER-OPERATED SCRAPER

Leland T. McGee, Los Angeles, Calif., assignor, by direct and mesne assignments, to Hydro-Speed Equipment Co., a corporation of California Application August 8, 1944, Serial No. 548,596

8 Claims. (Cl. 37—129)

This invention relates to power operated scrapers, and more particularly to that type of scraper adapted to be hitched to a power driven vehicle, such as a tractor, and to be operated therefrom, with power developed in connection therewith.

In operation these power operated scrapers have three different positions for the scraper bowl, namely: the loading or scraping position, the carrying position, and the dumping or spreading position.

My invention has to do with improved means for moving and holding the scraper bowl in any of these three positions, and to the control of such movement from the seat of the operator on the tractor.

I have designed my improved scraper to be operated from a well known power tractor, using the hydraulic means provided in connection therewith for operating said tractor, but have changed and adapted said hydraulic means for conveniently and efficiently operating my scraper bowl in the manner indicated, in addition to the regular functions of said tractor hydraulic mechanism.

I have also provided improved means for connecting or coupling my scraper with said tractor in order to avoid some of the objections which exist in connection with the present couplings, such as that of causing the front end of the tractor to rear up when the load on the scraper is heavy, and, instead, causing the front end of said tractor to hug the ground over which it is moving, and also to cause the scraper to more efficiently dig into the earth.

I have also provided an improved and simplified scraper bowl by providing a fixed apron or front end member in the carrying frame, whereby, when the bowl is moved to the carrying position, its scraping and digging edge closes up against said end member, whereby to prevent leakage or scattering of the dirt or other matter from said scraper.

I have also provided in combination with my scraper frame and bowl operable therein, a truck bed for carrying materials of all kinds and which can be readily mounted upon my scraper frame and bowl, to be supported thereby, and also operated thereby for tilting purposes, either for dumping, or for leaving said truck bed standing alone as the scraper is moved away from it, after it has been disconnected.

Other objects and advantages of my invention will be apparent from the following detailed description of one practical embodiment thereof, taken with the accompanying five sheets of drawings, which I will now describe. In the drawings—

Figure 1 is a plan view looking down upon my improved power operated scraper, with connections to the rear end of a power tractor, parts of the tractor being broken away to reduce the size of the figure;

Figure 2 is a longitudinal sectional view of said power operated scraper in the digging position, showing its connection with the tractor for operation and manipulation, taken on line 2—2 of Fig. 1;

Figure 3 is a similar view showing the scraper bowl and front end of the scraper frame raised to carrying position;

Figure 4 is a sectional view taken on the line 4—4 of Fig. 1, showing the scraper bowl in its unloading and spreading position;

Figure 5 is a cross sectional view through the connecting mechanism, taken on the line 5—5 of Fig. 1, being enlarged for clearness;

Figure 6:
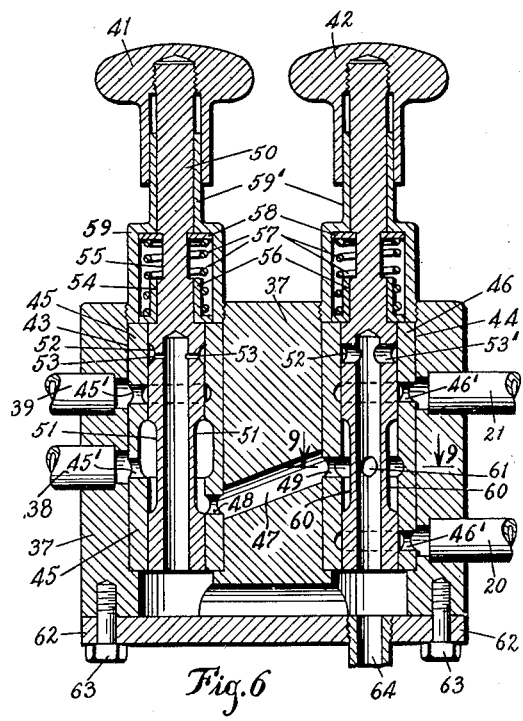
Figures 6, 7 and 8, are vertical sectional views taken through the valve mechanism, on the tractor, for control of the hydraulic power means for raising and lowering the front end of the frame and also for moving the scraper bowl in said frame to the different positions mentioned.
Figure 7:
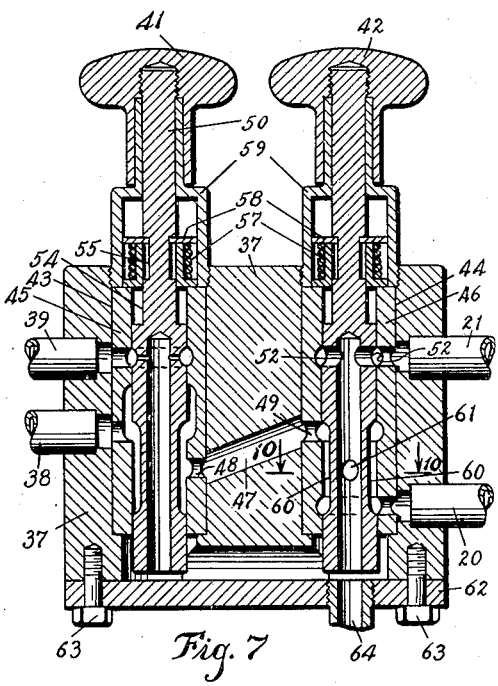
Figure 9:
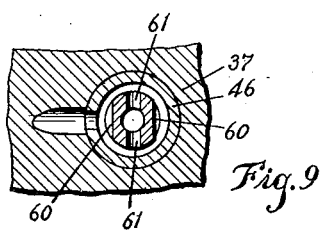
Figure 10:
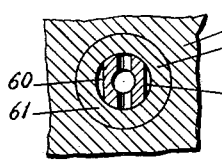

Figures 9 and 10 are fragmentary, horizontal sectional views, taken, respectively, on line 9—9, Fig. 6, and on line 10—10, Fig. 7;

Figure 11 is a side elevation of my load carrying bed in its deposited position, when not in use, and showing the scraper backed up to it in position to take it on to the frame for use as a truck;

Figure 12 shows said bed in place for operation as a truck;

Figure 13 shows the position of the truck bed after it has been pulled up on to the frame by the operation of the scraper bowl, and after the locking and operating connections have been made;

Figure 14 is a front end elevation as seen from the line 14—14, on Fig. 13;

Figure 15 is an enlarged fragmentary view showing the means for pivotally locking the truck bed to the rear end of the scraper frame;

Figure 16 is a sectional view taken on the line 16—16 on Fig. 15; and

Figure 17 is a perspective view of the connecting link between the bowl and the truck bed.

Referring now in detail to the drawings, my scraper frame is of square or rectangular form in plan view, as seen in Fig. 1, the front end 10 thereof being of tubular form, with a tongue-like extension 11, also of tubular form, with its end turned down and provided with a swivel connecting portion, as at 12, and again referred to. The opposite sides of said scraper are box-like members, somewhat diamond shape, as indicated, and providing room therein for the placement of operating cylinders, or rams, with connections for operating the scraper bowl. The side members are designated 13, 13, and are welded or otherwise secured to the ends of the front member 10, whereby to provide space in said tubular member 10, and in its tongue 11, for the pipes or tubes for connecting the hydraulic system of the tractor with the operating cylinders or rams of the scraper frame. A rear cross frame member 10' is seen in the plan view in Fig. 1.

Mounted in the rearward ends of said frame side members 13, 13, are two cylinders, as 14, with piston 15 and piston rod 15' therefrom, extended along in said side members to curved slots, as 16, in the inner walls of said side members, through which the piston rods at opposite sides of the scraper frame are pivotally connected, as at 17, with the opposite sides of the scraper bowl 18, as shown, said bowl being pivotally supported in the upper part of said side members 13, 13, as at 19, 19, whereby said bowl can be swung on its pivot support to the three different positions indicated in the different views.

Said cylinders have connected therewith pipes or tubes 20 and 21, from the front and rear ends thereof, and extended to and through the tongue-like member 11, as shown, for connection with the valve mechanism on the tractor, hereinafter again referred to. By this means of connection, it will be clear that the scraper bowl can be power moved in either direction. Of course, the ram type of hydraulic connection can be used if desired and single acting cylinders used.

Carrier wheels 22, 22, are shown supporting the rear end of said scraper frame, while the forward end is supported by its connection with the tractor lifting and pulling members, again referred to.

Across the front of the scraper frame structure, in connection with the tubular member 10, is a fixed apron or end member 23, shown in Figs. 2 and 3, and having the end walls, as 23', also indicated in the several figures. The scraper bowl 18 is open in its front in the usual construction, and has a digging or scraping lip or edge 18' adapted to be moved up into closing engagement with said fixed apron or end member 23, as will be understood from Fig. 3.

Referring now to Fig. 5, I have provided a cross member 24, of tubular form, having end castings or members 25, 25, connected therewith for connecting said tractor and scraper together with a swivel or universal joint connection. Said connection is made to the lifting and pulling levers 26, 26, which are a regular part of the tractor and are operable by the hydraulic system of the tractor for raising and lowering said levers for raising and lowering any implement which may be connected therewith. I have provided said cross member 24, at its opposite ends, with the connecting arms 26', 26', Figs. 1 and 5, connected with the ends of said levers 26, 26, as shown. Mounted to turn on said tubular member 24, is a connecting member 27, provided on top with a bolt-receiving opening for a bolt 28, at right angles to the axis of said member 24, for attaching thereto a swivel member 29, and to which the upper swivel member 12 is attached. This connection provides a universal connection for the end of the tongue 11 with the cross tubular member 24.

Any suitable or swivel connection can be used to permit free relative movements of the scraper and the tractor when in operation.

In order to prevent the front end of a tractor from rearing up under heavy load, as they frequently do with present connections, I have provided a chain or cable connection, as 30, connected at its forward end, as at 30' to an underside of the tractor, in advance of the traction wheels thereof, and extended under a depending member 31, and connected by means of a clearance link 32, and a strong coiled spring 33, with the front of the scraper at 33', substantially in the manner indicated, whereby a heavy load on the scraper will operate, through said chain and spring connection, to cause the front end of the tractor to hug the ground instead of rearing up. Referring to Figs. 2 and 3, it will be seen that there is a toggle action by reason of this type of connection, as the lifting levers 26, are moved from the position shown in Fig. 2 to the position shown in Fig. 3. When in the operating position shown in Fig. 2, this connection causes a weight transfer of the scraper from the scraper wheels to the scraper blade, which results in giving better digging or scraping action, and therefore gives better loading action. It also operates to transfer more weight or pull to the front wheels of the tractor, thereby causing the front end of the tractor to stay on the ground under heavy pulling.

There is also another advantage from this connecting system and that is: the weight which would normally be carried by the tractor lifting and pulling levers 26, 26, is reduced to a minimum, thereby relieving the tractor mechanism of much wear under heavy usage.

The tractor is provided with standard hydraulic equipment for raising and lowering implements which may be connected with the tension links or levers 26, 26, before referred to. This is accomplished through a cylinder and piston connection at 34, on the tractor, with link connection 35, to a hydraulic lift shaft 36, and link connections 36' with said levers 26, 26, as shown in all figures referred to. This is regular equipment adapted to my new use thereof.

Instead of the control valve furnished with said tractor, I have substituted a four-way valve mechanism, shown in Figs. 6 to 10, inclusive, and by means of which I not only control the raising and lowering of the regular operating levers 26, 26, as before referred to for raising and lowering the front end of the scraper frame by means of its tongue connection therewith, as any other implement connected therewith would be raised, but I also provide said valve with control connections for operating the scraper bowl in my scraper frame hydraulically and in the manner indicated by the three different positions thereof.

Referring first to Figs. 1, 2 and 3, my valve body is designated as a whole 37, and is shown mounted on the upper part of the tractor near the operator's seat. The hydraulic pump is designated P, with pipe 38 therefrom to the valve body, with return pipe 39, to the power end of the cylinder or ram 40, in which the piston 34 operates. This is moved in one direction as a ram by hydraulic power, as seen in Fig. 3, and returns by gravity, Fig. 2. Operation of the valve handle 41 in one direction opens passageway for operating fluid to the power end of said cylinder 40, and its movement in the opposite direction permits the fluid to return, and the levers 26, 26, to drop with their load.

The other valve handle 42 controls the flow of the hydraulic fluid to the cylinders of the scraper, for moving the bowl, as may be desired, with this hydraulic power. The pipes 20 and 21, which carry the hydraulic fluid to the bowl-operating cylinders 14, 14, are shown extended with the same numerals and connected with the control valve body 37, Figs. 1, 2 and 3. It will be seen that in the cross tubular member 10, each of the pipe lines 20 and 21 branch to the opposite sides of the scraper frame and to the respective cylinders therein.

Figure 8:
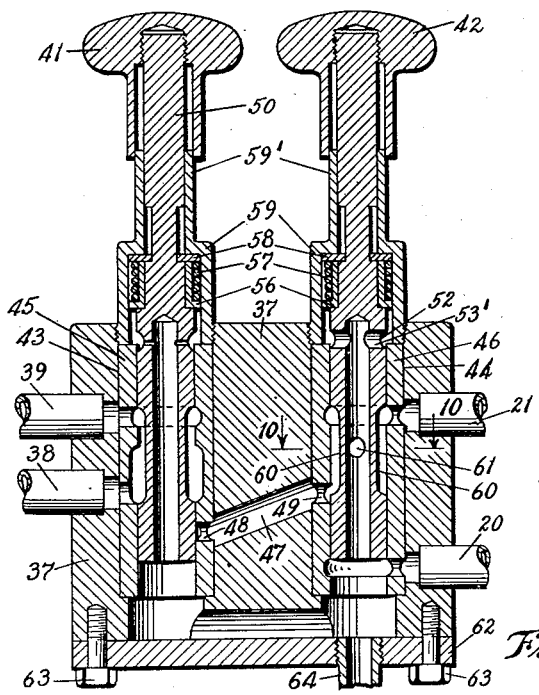

Referring to the control valve mechanism, Figs. 6 to 10 inclusive, the valve body 37, is provided with two bores 43 and 44, with two valve sleeves or bushings 45 and 46 therein, with holes 45' and 45' to register with the pipe connections at 38 and 39, and at the opposite side, the valve sleeve 46 is provided with holes 46', 46', to register with the pipe connections at 20 and 21, the pipe connections and the valve sleeves being the same in the three views in Figs. 6, 7 and 8.

The two bores 43 and 44, are connected for communication by an inclined bore, or passageway 47, and the valve sleeves 45 and 46 are provided with holes 48 and 49, respectively. These openings are controlled by valve members, which I will now describe.

A valve stem 50, as here shown, is provided at its lower end with a reduced portion 51, to provide a clearance space therearound which communicates with the pipe connection 38, and with the connecting passageway 47, in the position shown in Fig. 6. Said stem is also provided with an annular groove 52, with small bores 53, into its hollow center, thus retarding the return flow of the fluid. Said stem is also provided with differently reduced portions, 54 and 55, with a flanged sleeve 56 and coiled spring 57 and an open spring abutment disc 58, on the reduced portion 55, whereby said coiled spring operates to normally raise said valve stem, in the manner clearly seen in said Figs. 6, 7 and 8. A retaining cap 59, with stem 59' fits over said stem and said coiled spring 57, and screws into the top of the body 37, while the knob 41 fits over the upper end of the valve stem and the upper end of the stem 59' and has screw connection with the end of said valve stem, whereby said stem can be pushed down against the tension of the spring 57, and when released will be raised by said spring.

The valve stem of the other valve 42 is identical with the one just described down to and including the annular groove 52, but the bores 53' into the center of the stem are larger to permit free flow, and the same reference numerals are used for the upper portions of all of said valves.

This second valve 42, or that which controls the scraper bowl, below said annular groove 52, is made flat on opposite sides, as at 60, 60, with a hole 61 therethrough, between the flat sides, as will be seen in the sectional view, Fig. 9, on line 9—9, of Fig. 6, and also in Fig. 10, taken on line 10—10, Fig. 7, in another position.

The body 37 of said control valve is provided with a bottom plate 62, secured in place with screws 63, 63, and is also provided with a drain outlet and pipe 64, to be connected as a return pipe to the transmission, Fig. 4.

Thus from the driver's seat, he can manipulate said valves 41 and 42 in the control of the hydraulic system to raise and lower the lifting and pulling levers 26, 26, on the tractor, and the tongue connection of the scraper, whereby said scraper is raised in its front end to carrying position, as seen in Fig. 3 of the drawings, and he can also control the different movements of the scraper bowl from the scraping and loading position, seen in Fig. 2, to said carrying position, seen in Fig. 3, or to the dumping and spreading position, seen in Fig. 4.

Referring now to Figs. 11 to 19 inclusive, I will describe my improved power operated scraper as a load carrying truck, designed to be quickly and conveniently mounted and unmounted, and how this is accomplished through the power movements of the scraper bowl in its carrying frame, which also carries the truck bed or body thereon.

My truck bed may be of any desired type and is here designated as a whole 70, and is provided along its under, opposite sides with two long, somewhat triangular plates, as 71, with front extensions 71', and all designed and adapted to rest down upon the opposite side members 13, 13, of the scraper frame, and to have a detachable, pivotal connection therewith at the rearward ends of said side members, as at 72, shown more in detail in Figs. 15 and 16.

The front ends of these side plates are uniformly narrow, as at 71', and when the truck bed is in place on the scraper frame, said narrow front ends fit along the forwardly inclined portions of said side members, as will be clear from Fig. 12, where it is shown in place for operation.

The middle portions of said side plates 71, are provided with downwardly opening runways or channels, as 73, and seen in the sectional view in Fig. 16, and in Fig. 15, at the lower end of which is a foot plate 74, welded or otherwise secured to the lower edge of said side plate 71, at its deepest dimension, said foot plate extending around the rearmost ends of said scraper side frame members 13, with clearance therebetween, when in connected position, as seen in Fig. 12, and forming supporting feet for said truck bed when it is deposited and left standing on the ground, as seen in Fig. 11, where it is just about to be picked up by the scraper. Said side plates 71 also have across their deepest dimension a flange-like member 75, on which are two spaced projecting lugs, as 76, Figs. 11 and 18.

On the under side of said truck bed or body, in the middle thereof, is a depending leg 77, by means of which said truck bed is pulled on to the scraper frame by the scraper bowl 18, in a manner hereinafter again referred to.

Mounted on the tops of the rearward ends of the scraper frame members 13, 13, are supporting lugs or arms 78 which carry two rollers 79, adapted to run into said runways or channels 73, at opposite sides of said side plates 71, as will be clear from the drawings, and as seen in the sectional detail in Fig. 16. Said rollers 79 turn on hollow axles 80, and the sides of said runways or channels 73, at their lower ends, have holes 73' therethrough to register with said roller axles 80, when said parts are in the positions shown in Figs. 12, 13 and 15, and an insertable locking member 81 is provided to be inserted through said channel sides and said roller axles, as seen in Fig. 16, for pivotally locking said side plates 71 to the sides 13 of the scraper frame, as will be understood from the several views. The locking member 81 has an upstanding handle portion 81' adapted to rest along side of the flange-like member 75, as seen in Figs. 12 and 15 and between the lugs 76 on said member.

I have also provided two supporting legs or brace members, 82, 82, pivotally connected at their forward or upper ends to the under side of said truck bed, as at 83, 83, and have provided their lower ends with eyelets 84, 84, adapted to be placed over the upper ends of the members 81, 81, when said parts are all assembled for use, as seen in Fig. 12. When said truck bed is removed from the scraper frame and is to be left standing in unused position, said legs or brace members 82, 82, are let down to serve as brace means for said bed, as seen in Fig. 11.

In order to raise and lower said truck bed by means of the scraper bowl 18, as it is operated hydraulically into its different positions, I have provided two connecting links, as 85, Fig. 17, which are detachably connected at their lower ends into the opposite sides of the bowl, as at 86, and at their upper ends, they are connected with the side plates 71, as at 87, seen in Figs. 12 and 13. In Fig. 12, the truck bed is in place on the scraper for practical operation as a hauling truck. The links 85 are so connected that the truck bed can be raised by operation of the scraper bowl to its raised position, as shown in Fig. 13, and said links and the pivot insert member 81 detached, whereupon said bed can be let back by the operation of the bowl to the position as seen in Fig. 11. Said links are connected between the outer sides of the bowl and the inner faces of the side plates 71 of the truck bed.

The use and operation of this scraper carried truck bed may be briefly described as follows:

Assuming that the truck bed is standing in its idle position on the ground, as shown in Fig. 11, and it is desired to use the same, the scraper is backed up under it, in the position shown in said Fig. 11, and the scraper bowl is hydraulically raised as before described until its upper edge engages the depending member 77, as seen in Fig. 11, whereupon the truck bed is pulled forwardly, with the open runway or channel 73 moving on the rollers 79, until it reaches the position shown in Fig. 13. At this position the locking member 81 is inserted through the channel sides 73', the hollow axle 80, in said pulley 79, to pivotally lock the bed to the scraper frame. The lifting links 85 are also put into place, connecting the sides of the bowl to the side plates 71. At this place the bowl can then be lowered rearwardly and this will operate to bring the front end of said truck bed down upon the scraper frame into the operating position shown in Fig. 12. To raise and lower said truck bed, it is only necessary to raise and lower the scraper bowl in the manner described in connection with Figs. 1, 2 and 3, by use of the hydraulic power from the tractor for pulling said scraper, and as seen in Fig. 1.

Thus I have provided a power operated scraper in which the hydraulic mechanism of a tractor used for pulling the same is used for operating the scraper bowl from loading to dumping and spreading positions, and have also provided a truck bed adapted to the scraper frame, and connected for operation in the manner described with the power-operated bowl.

I do not limit the invention to the details of construction and arrangement used for illustrating the same, except as I may be limited by the hereto appended claims forming a part of this specification.

I claim:

1. The combination with a power tractor having hydraulically operated lifting and pulling members in its rear for implements to be coupled therewith, of a power scraper having a frame with a tongue-like member in front to be coupled with said lifting and pulling members and having carrying wheels in its rear, a scraper bowl pivotally mounted in said frame and movable therein to different positions, and means for hydraulically operating the same from loading to carrying and dumping positions, and supplemental hitching means for connecting said scraper to said tractor on its underside, forwardly of its traction wheels, to increase the traction of said tractor at its front end, said hitching means extending from the front of said scraper and including a coiled spring.

2. The combination with a power tractor having operable lifting and pulling members for coupling implements therewith, of a power scraper including a frame with carrying wheels and a tongue-like member, means coupling said tongue-like member with said lifting and pulling members with swivel action, a scraper bowl operable in said frame with means for operating the same to different positions, additional hitching means from the front of said scraper to the underside of said tractor, whereby pull thereon causes said tractor to hug the ground in front, said hitching means including a coiled spring to take pull strain from said coupling members, said coupling members having toggle action.

3. In combination, a power operated scraper, including a supporting frame with carrying wheels therefor, a scraper bowl pivotally supported therein and movable from loading to carrying and dumping positions, power means for moving said bowl in said frame, a truck bed adapted to fit upon the frame of said scraper and to be locked thereto, in operating position thereon, locking means therefor, and operating connections from said bowl to said truck bed for raising and lowering said bed on said frame with said bowl, as said bowl is power moved in said frame under said truck bed.

4. A power operated scraper including a frame, a scraper bowl pivotally supported therein and movable from loading to dumping position, hydraulic means for moving said bowl in said frame from loading to carrying and dumping positions, a load carrying bed provided on its underside with means to fit upon said scraper frame, means for interlocking said bed with said frame, said means permitting pivotal movement of said bed on said frame, operating connections from said scraper bowl to said bed for moving said bed up and down on said scraper frame, as said bowl is power moved from one position to another, and means for connecting the hydraulic mechanism with a source of hydraulic power.

5. The combination with a power tractor having hydraulically operated means for lifting and pulling implements connected thereto, of a power operated scraper including a frame, a bowl pivotally supported therein and movable on its pivotal support to different positions in said frame, hydraulically operated means carried in said scraper frame and connected with said bowl for moving the same, means for connecting said hydraulically operated means with the hydraulic system of said tractor, for control therefrom, a load carrying bed fitted upon the top of said scraper frame, means for detachably and pivotally interlocking it to said scraper frame, whereby it can be raised and lowered on said frame, and operating connections from said bowl to said bed for raising and lowering the latter by the operation of said bowl.

6. In combination with a power tractor, having an adjustable draw bar coupling member, a power operated scraper having a tongue-like member for coupling it with said coupling member, whereby it can be raised and lowered, said scraper having wheels at its rear end and having a scraper bowl forwardly of said wheels, and additional means for hitching said scraper to said tractor including a coiled spring, said additional hitching means being connected with the front of the scraper and to the underside of said tractor below the axle of its traction wheels, whereby a toggle action results in the tongue-like member of the scraper and its coupling with said tractor as said tongue-like member is raised and lowered.

7. In combination with a power tractor having pulling and lifting members for coupling implements thereto, with means for raising and lowering the same, a power operated scraper having a tongue-like member to be coupled to said pulling and lifting members, and additional hitching means extending from the front of the scraper to the underside of said tractor and including a coiled spring therein, whereby to give toggle action to said tongue-like coupling with said tractor, said coiled spring taking much of the pull strain.

8. The combination with a power tractor having hydraulically operated lifting members for raising and lowering implements coupled therewith, of a power scraper including a frame with a tongue-like member for coupling to said lifting members for raising and lowering the front end of said scraper, a bowl pivotally mounted in said frame and hydraulically operable, and hitching means from the front of said scraper to the underside of said tractor, below the axle of its traction wheels, including a coiled spring as a part of said hitching means, whereby pull strain on said hitching means causes the front of said tractor to hug the ground instead of rearing up under strain, and whereby there is toggle action in the tongue-like coupling to said tractor lifting members.

LELAND T. McGEE.

REFERENCES CITED

The following references are of record in the file of this patent:

UNITED STATES PATENTS

| Number | Name | Date |
|---|---|---|
| 1,497,552 | Davis | June 10, 1924 |
| 1,870,673 | Detrick | Aug. 9, 1932 |
| 1,877,958 | Paul | Sept. 20, 1932 |
| 1,939,950 | Brown | Dec. 19, 1933 |
| 2,089,539 | Cox | Aug. 10, 1937 |
| 2,271,631 | Davidson | Feb. 3, 1942 |
| 2,272,540 | Austin | Feb. 10, 1942 |
| 2,329,210 | McGee | Sept. 14, 1943 |
| 2,348,910 | Kadz | May 16, 1944 |
| 2,380,021 | Brown et al. | July 10, 1945 |
| 2,386,192 | Brimhall | Oct. 9, 1945 |